Oct. 11, 1960

P. GOUGH 2,955,338

REMOVABLE FERRULE FOR CABLES

Filed Sept. 18, 1956

INVENTOR.
PETER GOUGH
BY
*T.R. Geisler*,
ATTORNEY

Oct. 11, 1960

P. GOUGH 2,955,338

REMOVABLE FERRULE FOR CABLES

Filed Sept. 18, 1956

INVENTOR.
PETER GOUGH
BY F. R. Geisler.
ATTORNEY

United States Patent Office 2,955,338
Patented Oct. 11, 1960

2,955,338

REMOVABLE FERRULE FOR CABLES

Peter Gough, Salem, Oreg., assignor of one-third to John T. Conchuratt, Portland, Oreg.

Filed Sept. 18, 1956, Ser. No. 610,461

2 Claims. (Cl. 24—123)

This invention relates to metal caps or ferrules which are secured on the ends of cables for the purpose of holding the cable end in a hook or otherwise enabling devices to be attached onto the cable, and to prevent the end of the cable from slipping through the eye or opening provided for the cable in such devices.

More specifically, the invention relates to metal ferrules required on cables employed in logging operations and in other operations where detachable cables are used for hauling, hoisting and similar work. By means of such ferrules the ends of cables can be securely held in place in a hook or other attachment or fitting while capable of being easily and quickly removed from the same when desired.

Heretofore cable ferrules of this type have comprised metal cylinders which are more or less permanently mounted on the cable end by filling the space between the roughened inside wall of such metal cylinder or ferrule and the surface of the cable, with its spiral grooves, with molten metal, and in this way firmly anchoring the metal cylinder to the cable.

When cables break or wear out, which is not an infrequent occurrence in the logging industry, the ends of the cables with the ferrules attached thereto are generally thrown away and wasted since it has been found that the time and labor which would be required for removing such a ferrule from the end of a broken cable represents more expense than the cost of a new ferrule.

The main object of the present invention is to provide an improved ferrule adapted to be secured on a cable but which can be removed from the cable without any great difficulty or inconvenience and consequently which can be used over again when the cable, or portion thereof, on which the ferrule had previously been mounted, is discarded.

A related object of the invention is to provide a cable ferrule, which, although specifically adapted for easy removal from the cable, will nevertheless be capable of maintaining the same firm and sure hold on the cable as the ferrules commonly used heretofore.

A further object of the invention is to provide an improved and removable ferrule for cables which will be simple and practical in construction and which can be produced at reasonable cost, while at the same time making possible considerable saving and convenience due to the fact that the ferrule can be reused indefinitely.

The manner in which and the means by which these objects and other incidental advantages are attained with the improved ferrule of the present invention will be readily understood from the following brief description with reference to the accompanying drawings, the drawings also illustrating some of the forms in which the special removable ferrule may be made.

Referring to the drawings.

Figure 1:
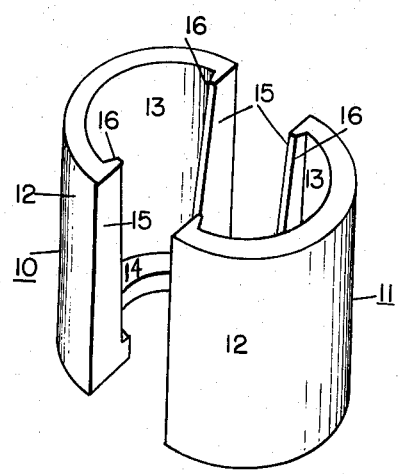
Figure 1 is a perspective view of the two halves or ferrule portions of which the ferrule is composed, these two halves or portions being shown temporarily separated for clarity.
Figure 2:
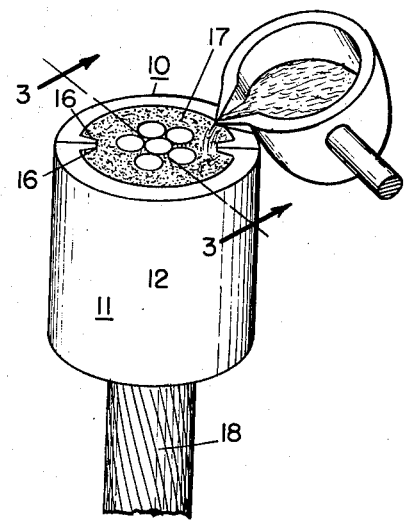
Figure 2 is a perspective view showing the same ferrule mounted in place on the end of a cable and illustrating the customary manner in which ferrules are secured in place through the pouring of molten metal into the space between the cable end and the surrounding ferrule.
Figure 3:
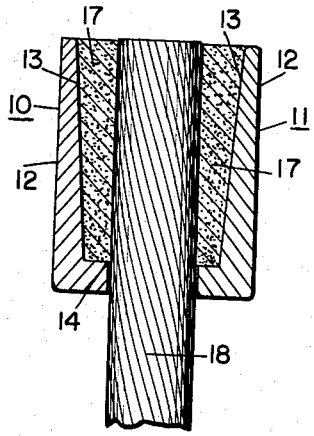
Figure 3 is a sectional elevation of the ferrule and cable taken on line 3—3 of Figure 2.

Referring first to Figures 1, 2 and 3, the ferrule comprises two half portions designated in general by the reference characters 10 and 11, and in the ferrule illustrated these half portions are identical in every respect. In this illustrated ferrule each of the sections or portions 10 and 11 is formed with an outside semi-cylindrical wall 12 and with an inside wall 13, the surface of which in general, preferably, although not necessarily, conforms to half of a cone frustum with the larger diameter at the top as viewed in the figures. Each half portion 10 and 11 is formed with a semi-circular flange 14 on the inside at the bottom and the diameter of the inner peripheral wall of this flange is only slightly greater than the maximum external diameter of the cable on which the ferrule is to be used.

These two half portions 10 and 11 have identical pairs of faces 15, 15, each pair lying in the same plane, and the respective faces of these pairs become opposed faces when the two half portions are brought together. An inwardly-projecting wall flange 16 forms a part of each of these faces 15. The two end walls of each semi-circular flange 14 also form extensions of the faces 15, 15.

The integral, inwardly-projecting wall flanges 16 extend for the entire distance from the bottom flange 14 to the top of the ferrule portions, as shown in Figure 1. While these flanges project inwardly from the interior wall surfaces 13, they do not project inwardly as far as the bottom semi-circular flanges 14 and the inner edges of these flanges 16 will be spaced some distance from the surface of the cable when the two half portions 10 and 11 are brought together in the mounting of the ferrule on the cable, as presently described.

This improved ferrule is secured on the cable in the same manner as has been customary with the familiar type of ordinary ferrules heretofore extensively used, that is to say, the ferrule is secured in place by filling the space inside the ferrule between the ferrule and the cable with molten metal and holding the ferrule in position on the cable until the molten metal hardens. In mounting this improved ferrule in the same manner the two half portions 10 and 11 are held with their pairs of faces 15, 15 pressed into contact while the molten metal, indicated at 17 in Figure 2, is poured into the ferrule cavity surrounding the cable 18, as illustrated in Figure 2. Any suitable holding means, such as a vise or clamp (not shown) could be used for holding the two half portions of the ferrule together and for manitaining the ferrule in position on the cable pending the hardening of the molten metal. As has been customary in the similar mounting of ordinary ferrules the molten metal preferably will consist of metal having a relatively low melting point.

It will be apparent from Figure 2 that, as soon as the molten poured-in metal 17 hardens the two half portions 10 and 11 of the ferrule will be held firmly together due to the engagement of the inwardly-projecting flanges 16 with the solidified metal. Also, since the metal 17 fills in the spiral valleys on the surrounded cable surface and furthermore engages the bottom flanges 14 in the ferrule, the metal filling 17 will prevent the ferrule from being pulled off the end of the cable 18 while the cable is in use.

Figure 7:
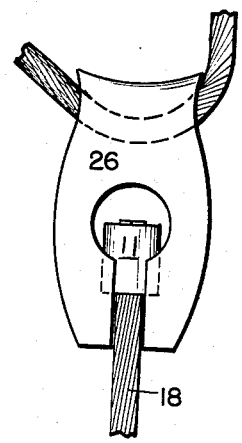
Figure 7 illustrates the use of the ferrule of Figure 2 in the holding of the cable and in a choker hook of familiar design.

The improved ferrule, when mounted on the cable in the manner described, serves the same purpose in exactly the same manner as the customary metal ferrules heretofore used. Thus, in Figure 7 the ferrule of Figures 1 and 2, when secured on the end of the cable 18 as described, is illustrated as being used as the means for removably attaching this end of cable 18 to a choker hook 26 of well known construction, it being assumed, of course, that the ferrule is of the proper size and shape to fit the particular choker hook or other attachment device with which the cable end is to be removably connected.

Figure 8:
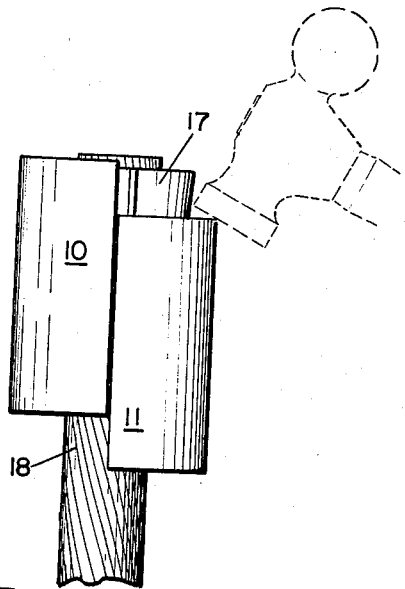
Figure 8 illustrates the manner in which each ferrule half or portion is removed from the end of a broken or discarded cable.

When the cable, on the end of which the removed ferrule has been mounted, has become broken or worn out and therefore the cable, or the portion on which the ferrule has been secured is to be discarded, the two portions of the ferrule can be separately broken loose from the holding metal on the cable end and thus in turn removed from the cable very easily by being given a few hard hammer blows on their top edges, as indicated in Figure 8, while the cable end of which the ferrule has been mounted is held by any suitable means, as for example, in a vise. The hammer blows applied for loosening each section of the ferrule are thus applied in the opposite direction from that in which the pulling force is exerted on the ferrule by the cable when the cable and ferrule are in use. Since each half portion of the ferrule is removed separately in this manner, and since the metal filler 17 will be of considerably less hardness than the ferrule itself, only a few hard hammer blows on the top of each ferrule half portion will be required for breaking such portion loose from the metal filler and thus enabling the half portion to be knocked downwardly a slight distance from the mounting on the cable end until such half portion has become entirely free. In this way the removal of each of the two ferrule half portions is accomplished without any particular difficulty and in a very short time, whereupon the removed ferrule half portions are immediately available for reuse.

Figure 4:
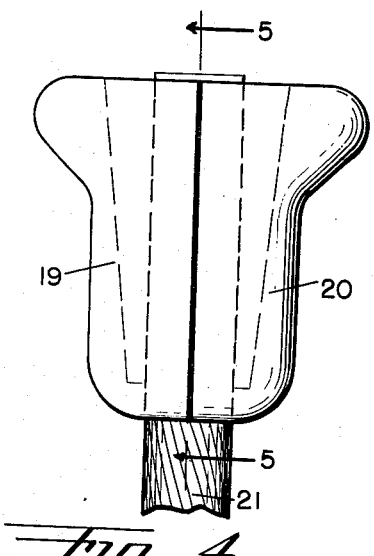
Figure 4 is a side elevation of another ferrule made in accordance with the present invention but having a differently shaped outer surface and showing the ferrule similarly mounted on a cable end.
Figure 5:
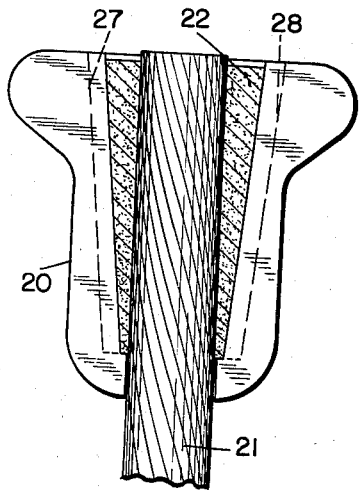
Figure 5 is a sectional elevation on line 5—5 of Figure 4.

Many variations in the overall shape and size of the improved ferrule would, of course, be possible without departing from the principle of the invention. Thus, for example in the ferrule shown in Figures 4 and 5, the two ferrule portions 19 and 20, while shaped differently from the half portions 10 and 11 of Figure 1, are formed similarly with inwardly-projecting flanges by which each half portion will be held firmly in place on the cable 21 by the filler metal 22. It will be obvious that each half portion 19 or 20 will be removable in the same way as previously described with reference to the half portions 10 and 11 in Figure 2.

Figure 6:
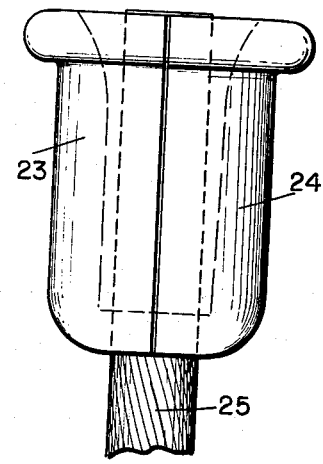
Figure 6 is an elevation of another ferrule embodying the invention but illustrating a further modified shape in which the ferrule may optionally be made.

By way of further illustration the ferrule in Figure 6 is shown in another shape which, under some conditions of use or with certain cable attachments, may be of a more suitable shape. The two half portions 23 and 24 of this ferrule are identical and have corresponding pairs of faces which register with each other when the two half portions are placed together and also have corresponding pairs of inwardly projecting flanges by which the two half portions are held together by the filler metal 25, just as previously explained.

The interior wall surfaces of the half portions 23 and 24, instead of being frusto-conical, as in the case of the surfaces 13 of the half portions 10 and 11 of Figure 1, are shown as being more or less semi-cylindrical. This shape of the inner wall surfaces is shown in the carrying out of the invention but preferably the interior walls are formed so that they will be spaced further from the cable at the top of the ferrule than at the bottom, and it will be understood that such formation to some extent facilitates the loosening of the ferrule half portions from the holding metal in the removing of the ferrule.

I claim:
1. A removable ferrule adapted to be mounted on a cable, said ferrule comprising a pair of complementary half portions adapted to be located on opposite sides of the cable respectively, each of said half portions having a curved inner wall surface of such size as to be spaced from the cable when said half portions are brought together about the cable, a bottom inwardly-extending flange on the bottom of each inner wall, each of said half portions terminating in a pair of lateral faces extending in the same plane and adapted to abut each other respectively when said half portions are brought together about the cable, said inner wall surfaces of said half portions having inwardly-projecting flanges coinciding with said lateral faces, whereby when said half portions are brought together about the cable and space between said inner wall surfaces and the cable is filled with poured-in metal, the engagement of said latter mentioned flanges with said poured-in metal will hold said half portions together while said ferrule remains secured on the cable, but the freeing of said half portions separately by movement axially from said poured-in metal will enable said ferrule to be removed entirely from the cable.

2. A removable ferrule adapted to be mounted on a cable, said ferrule consisting of a pair of identical half portions adapted to be located on opposite sides of the cable respectively, each of said half portions having an inner wall surface approximately in the shape of half a cone frustum and of such size as to be spaced from the cable when said half portions are brought together about the cable, a bottom inwardly-extending flange on the bottom of each inner wall, each of said bottom flanges having an inner substantially semi-circular periphery of slightly larger diameter than the external diameter of the cable, each of said half portions terminating in a pair of lateral faces extending in the same plane and adapted to abut each other respectively when said half portions are brought together about the cable, said inner wall surfaces of said half portions having inwardly-projecting flanges coinciding with said lateral faces, whereby when said half portions are brought together about the cable and the space between said inner wall surfaces and the cable is filled with poured-in metal, the engagement of said latter mentioned flanges with said poured-in metal will hold said half portions together while said ferrule remains secured on the cable, but the freeing of said half portions separately by movement axially from said poured-in metal will enable said ferrule to be removed from the cable.

References Cited in the file of this patent

UNITED STATES PATENTS

| 1,293,383 | Eaton | Feb. 4, 1919 |
| 1,297,615 | Voss et al. | Mar. 18, 1919 |
| 1,298,255 | Pieper | Mar. 25, 1919 |
| 1,934,239 | Schupp | Nov. 7, 1933 |
| 2,481,025 | Koch | Sept. 6, 1949 |
| 2,554,387 | Saul | May 22, 1951 |
| 2,779,613 | Maiwurm | Jan. 29, 1957 |

FOREIGN PATENTS

| 3,839 | Great Britain | Sept. 24, 1879 |
| 459,472 | Great Britain | Jan. 8, 1937 |
| 839,996 | France | Apr. 17, 1939 |